MOTOR DRIVEN GOLF CART WITH DETACHABLE RIDER UNICYLE

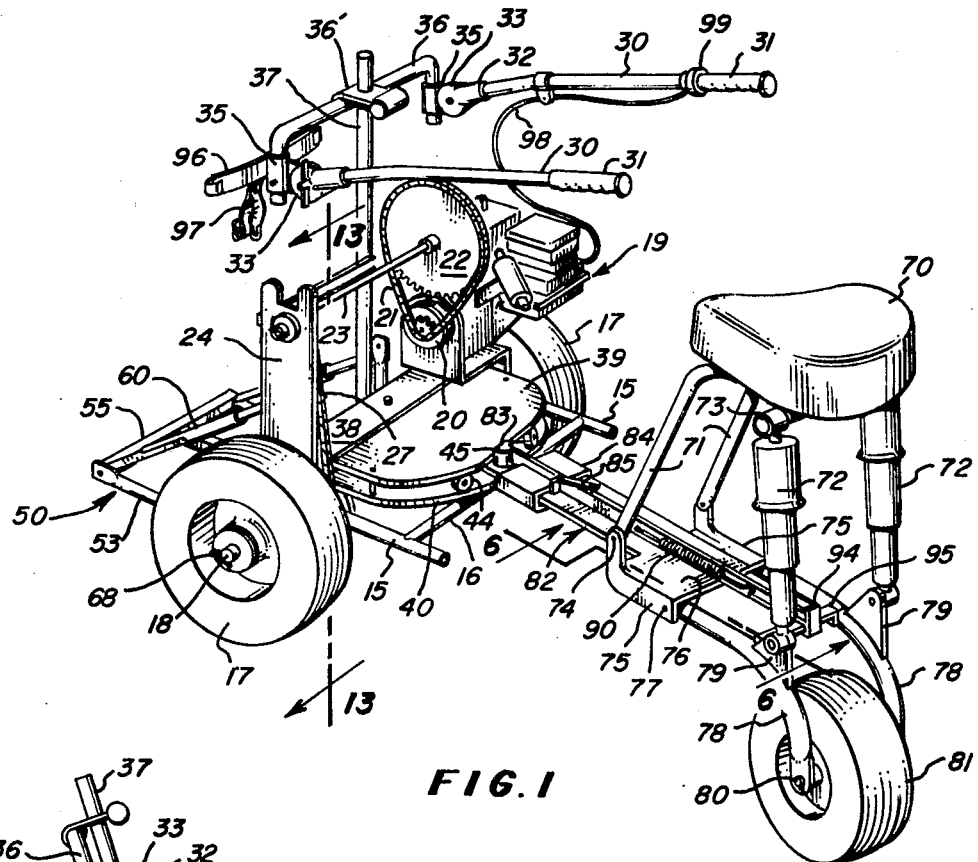
FIG. 1
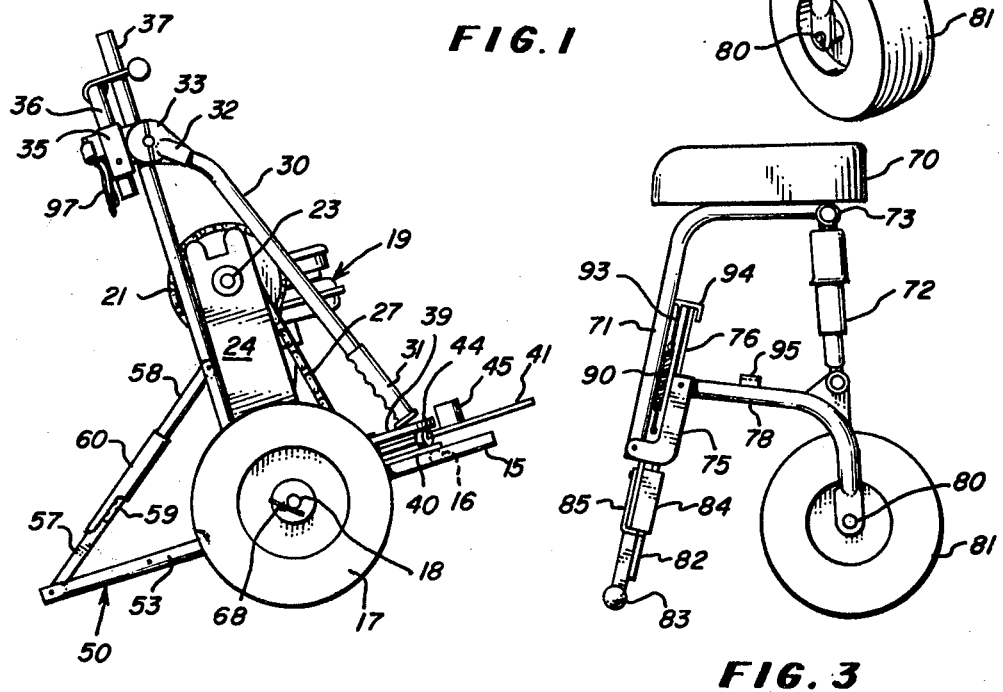
FIG. 2
FIG. 3
INVENTOR.
Richard Kelley Jackson
BY Bertha L. MacGregor
ATTORNEY INVENTOR.
Richard Kelley Jackson
BY Bertha L. MacGregor
ATTORNEY May 26, 1970  R. K. JACKSON  3,513,924

Filed Aug. 6, 1968  4 Sheets-Sheet 3

INVENTOR.
Richard Kelley Jackson
BY Bertha L. MacGregor
ATTORNEY

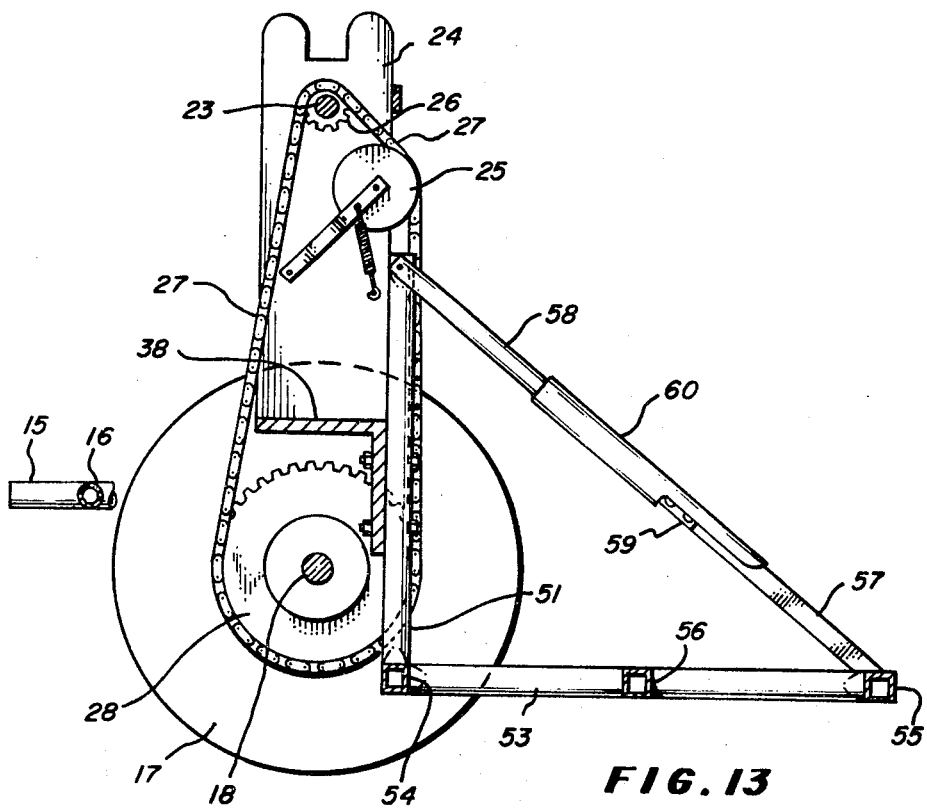

United States Patent Office 3,513,924
Patented May 26, 1970

3,513,924
MOTOR DRIVEN GOLF CART WITH
DETACHABLE RIDER UNICYCLE
Richard Kelley Jackson, P.O. Box 176,
Eads, Colo. 81036
Filed Aug. 6, 1968, Ser. No. 750,724
Int. Cl. B62d 61/06
U.S. Cl. 180—11                  11 Claims

ABSTRACT OF THE DISCLOSURE

A motor driven golf cart with detachable rider unicycle, in which each of the units is collapsible, and the rider unit can be carried, when detached and collapsed, by the golf cart. When both units are collapsed, they can be stored in the trunk of a conventional motor vehicle. The cart comprises a frame, a pair of pivotally mounted handles, an engine, a pair of wheels drivingly connected to the engine, means for unlatching the wheels from driving means, a pivotally mounted collapsible carrier for a golf bag, and a pivotally mounted draw bar. The rider unit comprises a seat on a frame supported by a rotatable wheel, and a draw bar pivotally connected to the frame for engaging the cart draw bar to connect the two units together or for moving to collapsed position to shorten the length of the rider unit.

---

This invention relates to a motor driven golf cart and a detachable rider unit. Each of the two units includes collapsible parts. When detached from each other, the two units can be collapsed and be stored in the trunk of a conventional motor vehicle. The golf cart and attached rider unit support a golf club bag and a single rider. The engine speed is designed for control by the rider at speeds which provide idling speed, slow walking speed for a golfer who desires to walk beside the machine, and faster speeds for one who is seated on the rider unit attached to the motor driven golf cart.

The main object of the invention is to produce a versatile combination golf cart and rider unit in which the cart serves as the power unit for the rider unit and support for a golf club bag, and in which the rider unit transports the golfer at selected speed over a golf course. A further object is to provide simple and efficient mechanism for coupling the two units together, for maintaining them in coupled relationship, and for disconnecting them at will and with minimum effort.

Another object is to provide collapsible means whereby protruding parts of the golf cart, such as the handles and bag carrier, can be moved into non-protruding positions, and whereby the longitudinal dimension of the rider unit can be shortened and the unit as a whole can be supported and carried by the motor unit. These features permit the golfer to either use the motor for transporting the cart and rider unit, or to use the golf cart with or without motor power to carry the rider unit, or to detach the units from each other, collapse the two, and store them in a vehicle for transportation.

Among the advantages of the invention is the fact that the combined cart and rider unit can be used by a single golfer to ride or walk at selected speed. When coupled together, the rider unit supports the golf cart in upright position, and the golfer can select a club from the bag supported on the carrier and make his shot. If the golfer prefers to use the cart without the rider unit, the two can be disconnected, and the cart can be pulled by the player. In such case, while the golfer is playing, the cart can be supported in substantially upright position by the wheels and the carrier contacting the ground. If the golfer prefers to walk alongside the golf cart when motor driven, the engine speed can be adjusted to convenient walking speed, and on uphill terrain the motorized cart can aid the golfer who places his hand on one of the handles. Further advantages are attained by the detachment of the units and collapsing them for storage, or by detaching them and collapsing only the rider unit for mounting on the cart unit for carrying the rider unit by the motor unit.

Other objects and advantages will appear from the drawings and the following description.

In the drawings:

FIG. 1 is a perspective view of my motor driven golf cart and detachable rider unit.

FIG. 2 is an elevational side view of the golf cart detached from the rider unit.

FIG. 3 is an elevational side view of the rider unit detached from the golf cart, showing the draw bar means and frame in collapsed positions.

FIG. 13 is a vertical longitudinal sectional view in the plane of the line 13—13 of FIG. 1, looking in the direction indicated by the arrows.

FIG. 14 is an elevational side view of the golf cart and of the rider unicycle, detached, showing the cart and rider unit collapsed, and the latter carried by the cart.

Figure 4:
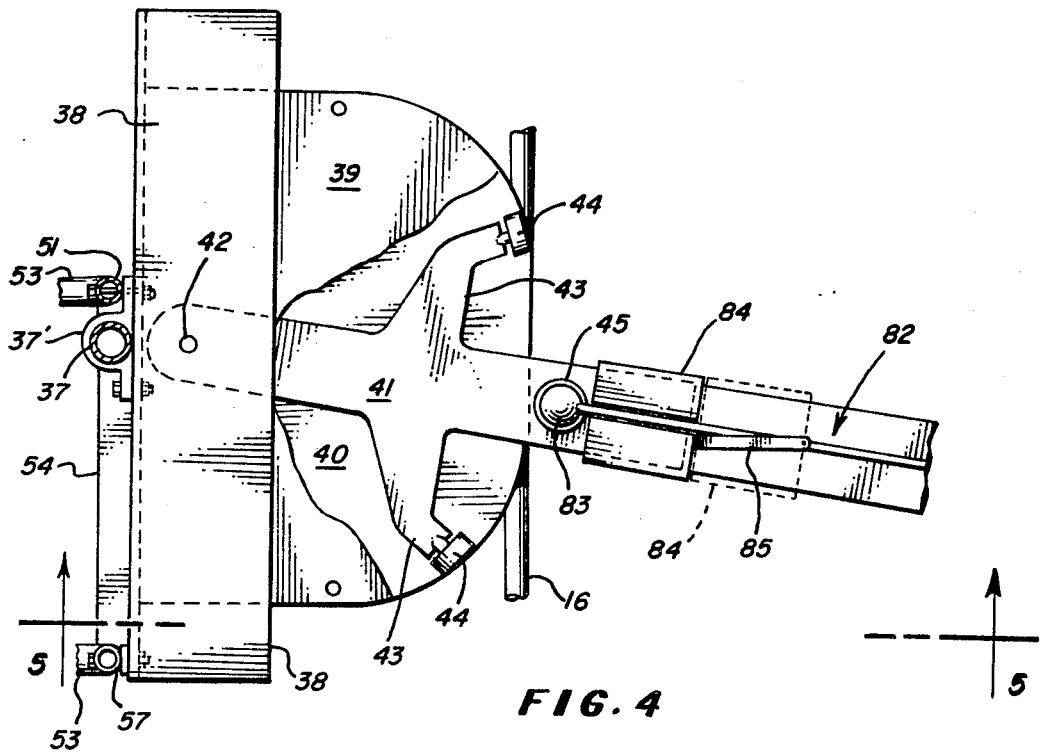
FIG. 4 is a top plan view, on an enlarged scale, of part of the golf cart and part of the connecting means between the cart and rider unit.

In the embodiment of the invention shown in the drawings, the base frame comprises longitudinal rods 15 and a cross rod 16 connected to the rods 15 to serve as a foot rest and steering means. A pair of wheels 17 are mounted on an axle 18 driven through any suitable operative connections by a gasoline engine 19 which includes a differential gear box and conventional parts which need no description herein. Idling speed preferably is 700 to 1200 r.p.m. When the engine speed is increased to 1800 r.p.m. a centrifugal clutch in the power train is engaged, thereby producing two and one-half m.p.h. ground speed which is a slow walking speed. The engine speed can be increased to 3600 r.p.m. which produces a five m.p.h. ground speed. A throttle control for maintaining preferred speed within the stated limits will be referred to hereinafter. One example of operative connections between the engine and the wheel axle comprises the gear 20, belt or chain 21, sprocket 22, horizontal shaft 23 mounted in vertical supports 24, pulley 25, gear 26, belt 27 and sprocket 28, on axle 18, shown in FIGS. 1 and 13.

Figure 5:
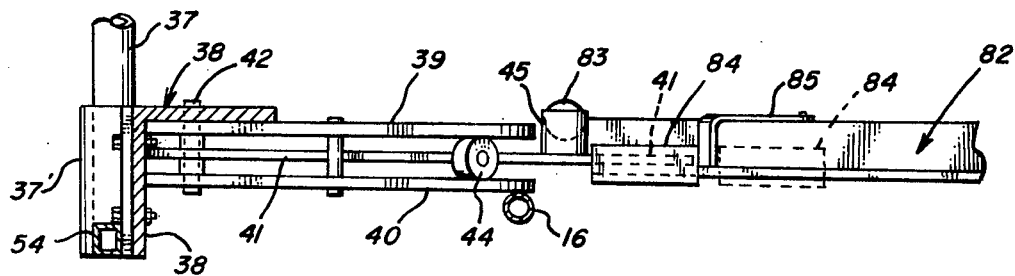
FIG. 5 is a vertical sectional view in the plane of the line 5—5 of FIG. 4, partly in elevation.

A pair of handles 30 provided with grips 31 are mounted in sockets 32. Each socket has a disc form extension 33 provided with teeth on one face for engaging teeth on a fixture 34 which includes a sleeve 35 mounted on the vertical leg of a cross rod 36. By manipulating a wing nut, the teeth on the discs 33 and 34 can be disengaged, permitting the handles 30 to be moved pivotally relatively to the cross rod 36 into normal or collapsed positions. The cross rod 36 is connected to a bracket 36' which has a hole for receiving the vertical central standard 37. The lower end of the standard 37 is fastened at 37' to an angle plate 38 which extends transversely of the cart, as shown in FIGS. 4 and 5. A single handle may be used instead of a pair.

The angle plate 38 has connected thereto an upper horizontal plate 39 and a lower horizontal plate 40, spaced apart to accommodate between them a draw bar 41 pivotally mounted at 42 in the plates 39, 40. The draw bar 41 has arms 43 supported on rollers 44 which roll on the lower plate 40 when the draw bar is moved relatively to the cart angle bar 38. The draw bar 41 is provided on its free end with an upwardly opening socket 45 designed to receive a part of the rider unit which is described hereinafter.

Figure 9:
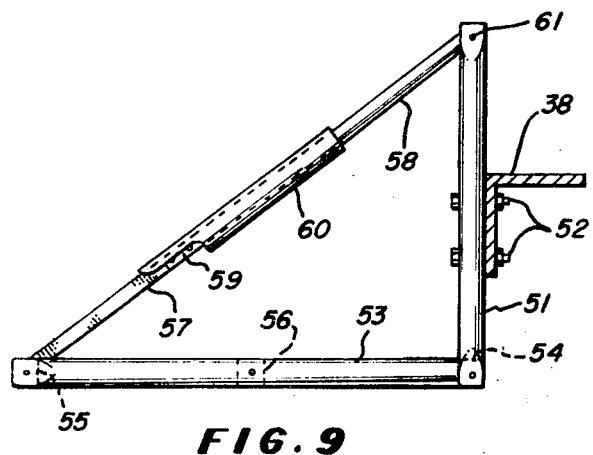
FIG. 9 is an elevational side view of the golf bag carrier.
Figure 10:
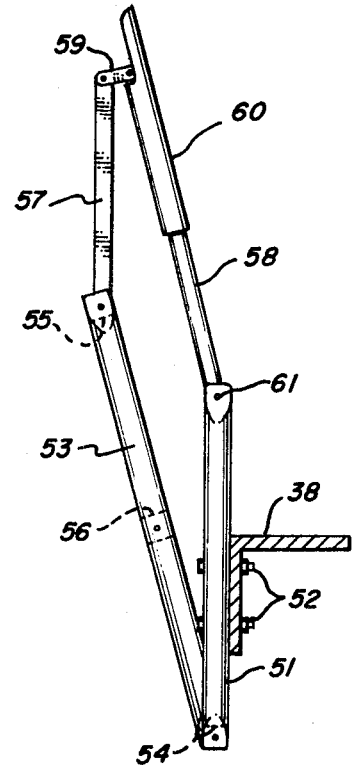
FIG. 10 is an elevational side view of the golf bag carrier in collapsed position.

A golf bag carrier, designated 50 as a whole in FIG. 1, is shown in detail in FIGS. 2, 9 and 10. The carrier is attached to the angle plate 38 to extend forwardly from the front of the cart. The carrier serves to support a golf club bag and also to support the cart in upright position when the cart is detached from the rider unit. It can be collapsed to decrease the length of the cart when it is desired to store the machine in a vehicle or otherwise. The carrier comprises a pair of vertical rods 51 at each side bolted at 52 to the angle plate 38, a pair of horizontally extending side bars 53 pivotally connected to a cross rod 54 and to the vertical rods 51, and pivotally connected at their opposite ends to a cross rod 55 and collapsible members which include rods 57, 58, and intermediate link 59 pivotally connected together and held in axial alignment by a slidable sleeve 60 which permits collapsing of the rods 57, 58 and link 59 from the bag supporting position of the carrier as shown in FIG. 9 to the collapsed position shown in FIG. 10. The members 58 are pivotally connected at 61 to the vertical rods 51, and another cross rod 56 extends from one side bar 53 to the other for supporting the bag (not shown).

Figure 11:
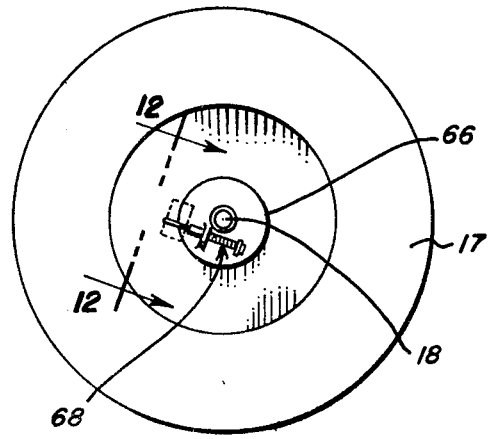
FIG. 11 is an elevational side view of one of the golf cart wheels showing latching means for drivingly connecting the wheel and axle.
Figure 12:
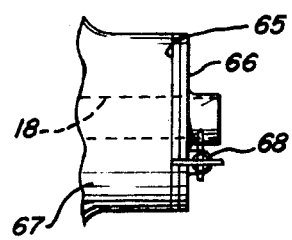
FIG. 12 is an elevational view of the latch means in the plane of the line 12—12 of FIG. 11.

When the cart is motor driven, either for drawing the rider unit and rider, or for moving over the ground while the golfer walks beside it, the wheel axle 18 is being rotated and the wheels 17 are operatively connected to the axle. When it is desired to pull the cart without motor operation, the wheels can be operatively disconnected from the axle to permit free wheeling. Referring to FIGS. 11 and 12, the wheels 17 are drivingly connected to the axle 18 by latching means comprising a pair of discs 65, 66, on the hub 67, the discs being parallel with very small clearance, about 1/32 inch, between them. One of the discs is attached to each of the wheels and the others to the axle 18. The discs are provided with slots which can be brought into registering positions to receive a spring loaded key 68 which locks the discs together and retains the wheels in driven relationship to the axle.

The rider unit of this invention comprises a seat 70, front legs 71 and shock absorber type rear legs 72 pivotally connected at their upper ends to the cross piece 73 on the lower side of the seat. Each front leg 71 is pivotally connected at 74 to a bell crank lever 75 which is part of a plate 76 between the two levers 75. The levers 75 are pivotally connected at 77 to curved frame arms 78. The lower ends of the legs 72 are pivotally connected to brackets 79 fastened to the curved arms 78 between their ends, the lower ends of the arms 78 being pivotally mounted on the axle 80 of the wheel 81.

The forward portion of the plate 76 is narrower than the rest of the plate and forms a draw bar 82 in the form of an inverted T, terminating at its front end in a steel ball 83 designed to seat in the socket 45 of the draw bar 41 of the golf cart. When the ball 83 has been seated in the socket 45, parts of the draw bars will overlap and are held together rigidly by a slidable sleeve 84 which engages both members as shown in FIGS. 4 and 5. When in the full line position of FIGS. 4 and 5, the sleeve 84 is prevented from moving rearwardly toward the rider unit by a pivotally mounted lever 85 serving as a stop against the rear edge of the sleeve 84. Thus the two units are held together when the golfer desires to ride on the rider unit drawn by the motor driven golf cart.

When it is desired to detach the rider unit from the cart, the lever 85 is moved pivotally out of the way so that the sleeve 84 can be moved rearwardly as shown in broken lines and then the lever 85 can be placed to have its free hook end engage the sleeve to prevent forward movement of the sleeve 84.

Figure 6:
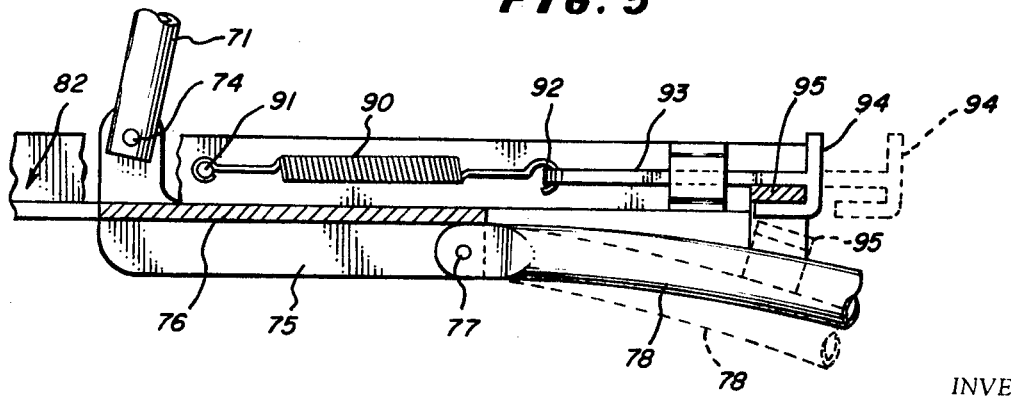
FIG. 6 is a vertical sectional view, partly in elevation, on an enlarged scale, in the plane of the line 6—6 of FIG. 1.
Figure 7:
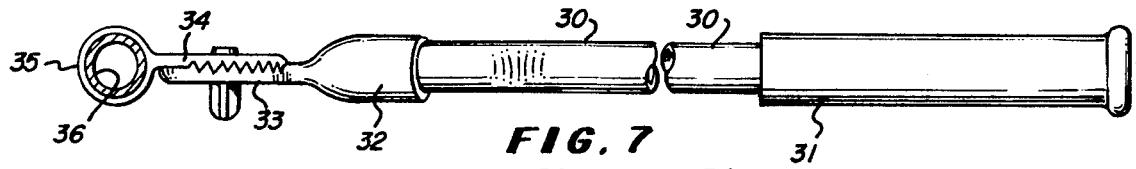
FIG. 7 is a top plan view, partly in section, on an enlarged scale, of one of the control handles of the machine as shown in FIG. 1.
Figure 8:
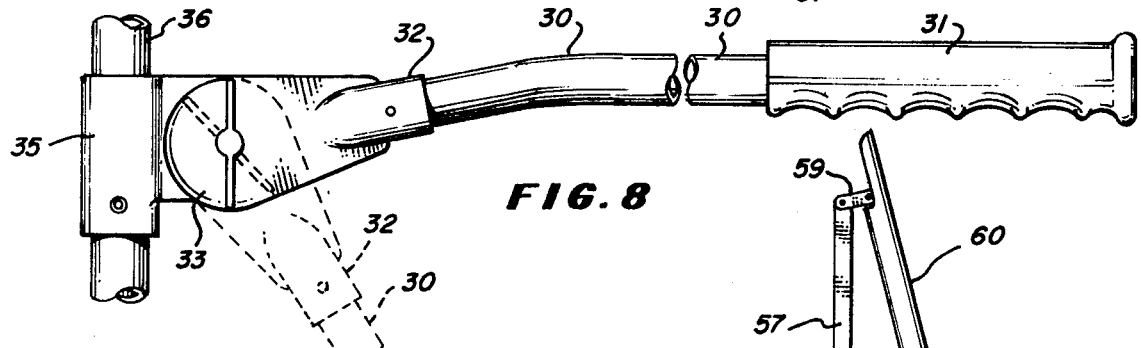
FIG. 8 is an elevational side view of the parts shown in FIG. 7.

A tension spring 90 is attached at one end 91 to the rider unit draw bar 82, and at its other end 92 to a hook member 93 which has a hook 94 for engaging the cross rod 95 fastened to the curved arms 78 as shown in FIG. 6. The hook 94 can be manually released from the rod 95 when it is desired to collapse the rider unit into the position of FIG. 3, where the hook 94 then engages the inner end of the draw bar 76. The hook 94 is released from the rod 95 by pulling it into the broken line position of FIG. 6.

Straps 96, 97, on the cross rod 36 are provided for holding a golf club bag upright on the carrier 50. A throttle line 98 and control 99 are mounted on one of the handles 30 for manual control by the golfer.

The operation of the combined golf cart and rider unit will be understood from the foregoing description but may be summarized briefly as follows: The two units are connected as shown in FIG. 1 by the draw bars 41 and 82, held rigidly together by the sleeve 84 which is retained by the lever 85 as shown in FIG. 5. The motor may be operated at idling, slow walking or faster walking speeds between 700 r.p.m. and 3600 r.p.m. The rider controls the speed by the throttle control 99 and controls the steering by the handles 30 and foot rest bar 16. The wheels 17 are latched to the axle 18 as heretofore described. If the cart is being used without the unicycle rider unit, the carrier 50 serves to support the cart in upright position by bearing on the ground while unattended by the golfer.

When it is desired to carry the rider unit on the cart, the draw bars 41 and 82 are detached by moving the sleeve 84 rearwardly to the broken line positions of FIGS. 4 and 5, lifting the ball 83 out of the socket 45 and unhooking the hook 94. Then the draw bar 82 and plate 76 with levers 75 are moved to the position of FIG. 3. The rider unit, when detached and collapsed, can be carried on the cart as shown in FIG. 14, with one of the frame arms 78 resting on the support 24 and the wheel 81 supported on the horizontal plate 39 of the cart. If desired, the cart also can be collapsed as shown in FIG. 14 by folding the carrier up against the front of the cart and turning the handles 30 downwardly.

For storage, in the trunk of an automobile, or elsewhere, each of the units may be separately collapsed and handled conveniently.

Changes may be made in details of construction and in the form and proportions of parts without departing from the scope of the invention.

I claim:
1. A motor driven golf cart and detachable rider unit comprising
   (a) a cart having a frame,
   (b) handle means pivotally mounted on the frame,
   (c) a variable speed motor supported by the frame,
   (d) a wheel carrying axle drivingly connected to the motor,
   (e) a golf bag carrier pivotably mounted on the frame for movement from horizontal bag supporting position to collapsed substantially vertical position adjacent the frame,

(f) a pivotally mounted draw bar extending rearwardly from the cart frame,
(g) a rider unit provided with a seat,
(h) a rider unit frame comprising seat supporting members, a wheel axle, axle supporting arms and draw bar pivotally connected together for movement of the draw bar into substantially horizontal or vertical positions,
(i) a wheel on the rider unit axle, and
(j) means on the draw bars of the cart and rider unit for detachably connecting them together.

2. The cart and rider unit defined by claim 1, which includes means for drivingly disconnecting the cart wheels from the motor.

3. The cart and rider unit defined by claim 1, in which the cart frame includes a vertical standard on which the rider unit can be supported when the rider unit is detached from the cart and its draw bar pivotally moved to substantially vertical position.

4. The cart and rider unit defined by claim 1, in which the means on the draw bars of the cart and rider unit for detachably connecting them together comprise a ball on one of the draw bars and a socket on the other, and a sleeve slidable on said bars to retain them in connected relationship.

5. The construction defined by claim 4, which includes a lever pivotally mounted on one of the draw bars for engaging the sleeve and preventing slidable movement.

6. The cart and rider unit defined by claim 1, which includes a raised cross bar connected to the cart frame, a bracket fixed on each end of the cross bar, a toothed surface on each bracket, and a toothed surface on each handle for engaging the toothed surface on said bracket and holding the handle in selected pivotal position relatively to the cross bar.

7. The cart and rider unit defined by claim 1, in which the rider unit draw bar includes bell crank levers pivotally connected to the seat supporting members and to the axle supporting arms.

8. The cart and rider unit defined by claim 1, in which the cart includes a pair of horizontally disposed plates between which the draw bar is pivotally mounted, and said draw bar includes arms having rollers thereon for rolling movement on the lowermost plate.

9. A motor driven golf cart and detachable rider unit comprising
(a) a cart having a frame which includes a raised horizontal cross bar and a lower foot rest bar,
(b) handles pivotally mounted on the raised cross bar movable to horizontally extending and vertically depending positions relatively to the cross bar,
(c) a motor supported by the frame,
(d) a wheel carrying axle drivingly connected to the motor mounted on the frame,
(e) a golf bag carrier comprising a bag supporting platform and side bars pivotally connected to the frame and movable into collapsed position closely adjacent the frame,
(f) a unicycle rider unit, and
(g) means between the rider unit and the cart detachably connecting them together,
said carrier and wheel carrying axle supporting the cart in upright position when the cart is detached from the rider unit and the carrier is uncollapsed.

10. The cart and rider unit defined by claim 9 in which the rider unit includes a seat-supporting and axle-carrying frame which is collapsible to shorten its length, and the cart has means for supporting and carrying the rider unit when detached from the cart.

11. A motor driven golf cart and detachable rider unit comprising
(a) a wheeled motor driven cart provided with a collapsible carrier pivotally connected to the cart and handle bars pivotally movable from horizontally extending to vertically depending positions whereby the length of the cart is decreased,
(b) a unicycle rider unit provided with a seat-supporting and axle-carrying frame which is collapsible to shorten its length, and
(c) means between the cart and rider unit detachably connecting them together.

References Cited
UNITED STATES PATENTS

| | | | |
|---|---|---|---|
| 2,298,054 | 10/1942 | Howell. | |
| 2,919,758 | 1/1960 | Newton et al. | |
| 2,932,526 | 4/1960 | Campbell | 280—47.18 X |
| 3,043,389 | 7/1962 | Steinberg | 180—27 |
| 3,087,562 | 4/1963 | Harks | 180—11 |
| 3,094,185 | 6/1963 | Racoosin | 180—11 |
| 3,167,146 | 1/1965 | Rudolph | 180—19 |
| 3,190,672 | 6/1965 | Swanson et al. | 180—11 X |
| 3,241,852 | 3/1966 | Muller et al. | 280—47.18 X |
| 3,330,371 | 7/1967 | Seaman | 180—11 |
| 3,336,042 | 8/1967 | Southall | 180—12 X |

KENNETH H. BETTS, Primary Examiner

U.S. Cl. X.R.

180—27; 280—87.1, 47.37